United States Patent
Sun et al.

(10) Patent No.: US 9,352,280 B2
(45) Date of Patent: May 31, 2016

(54) METHOD OF ESTIMATING HYDROCARBON STORAGE IN A CATALYTIC DEVICE

(71) Applicant: GM GLOBAL TECHNOLOGY OPERATIONS LLC, Detroit, MI (US)

(72) Inventors: Min Sun, Troy, MI (US); Michelangelo Ardanese, Royal Oak, MI (US); Stefano Cassani, Turin (IT); Andrea Dutto, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 171 days.

(21) Appl. No.: 14/163,120

(22) Filed: Jan. 24, 2014

(65) Prior Publication Data

US 2015/0209729 A1 Jul. 30, 2015

(51) Int. Cl.
*B01D 53/94* (2006.01)
*F01N 3/08* (2006.01)
*F01N 3/20* (2006.01)
*F01N 9/00* (2006.01)

(52) U.S. Cl.
CPC ............ *B01D 53/9495* (2013.01); *F01N 9/005* (2013.01); *B01D 53/9459* (2013.01); *F01N 3/0814* (2013.01); *F01N 3/2006* (2013.01); *F01N 3/208* (2013.01); *F01N 9/002* (2013.01); *F01N 2610/03* (2013.01); *F01N 2900/0601* (2013.01); *F01N 2900/1402* (2013.01); *F01N 2900/1618* (2013.01); *F01N 2900/1621* (2013.01); *F01N 2900/1622* (2013.01)

(58) Field of Classification Search
CPC .................................................. B01D 53/9495
USPC ............................................ 423/212; 436/37
See application file for complete search history.

(56) References Cited

U.S. PATENT DOCUMENTS

| | | | | |
|---|---|---|---|---|
| 6,602,471 B1 * | 8/2003 | Sato | ...................... | F01N 3/0814 422/68.1 |
| 6,622,480 B2 * | 9/2003 | Tashiro | ................ | B01D 53/944 60/274 |
| 7,043,903 B2 * | 5/2006 | Onodera | ............... | F01N 3/0231 60/274 |
| 7,721,532 B2 * | 5/2010 | Liu | ..................... | B01D 53/9409 60/274 |
| 8,241,579 B2 * | 8/2012 | Chigapov | ............. | B01D 53/944 422/177 |
| 2002/0112472 A1 * | 8/2002 | Tashiro | ................ | B01D 53/944 60/295 |
| 2006/0042237 A1 * | 3/2006 | Nonoyama | ........... | F01N 3/0253 60/297 |
| 2006/0107658 A1 * | 5/2006 | Hiranuma | ............. | F01N 3/0231 60/297 |
| 2006/0191258 A1 * | 8/2006 | Opris | ...................... | F01N 9/002 60/297 |
| 2006/0260298 A1 * | 11/2006 | Iida | ......................... | F01N 9/002 60/297 |
| 2007/0000239 A1 * | 1/2007 | Liu | ..................... | B01D 53/9409 60/286 |
| 2007/0056273 A1 * | 3/2007 | Wills | .................... | F01N 3/0231 60/297 |
| 2011/0162352 A1 * | 7/2011 | Svensson | ................ | F01N 9/002 60/297 |
| 2012/0297751 A1 * | 11/2012 | Sun | ......................... | F01N 9/002 60/274 |
| 2014/0123608 A1 * | 5/2014 | Sun | ....................... | F02D 41/029 55/283 |

OTHER PUBLICATIONS

Aswami, D. et al, submitted to ASME Journal of Dynamic Systems, Measurement, and Control in 2003, 23 pages, downloaded from http://web.eecs.umich.edu/~grizzle/papers/aInc_diesel.pdf.*

* cited by examiner

*Primary Examiner* — Arlen Soderquist
(74) *Attorney, Agent, or Firm* — Quinn Law Group, PLLC

(57) ABSTRACT

A method of estimating hydrocarbon storage in a catalytic device of an exhaust gas treatment system includes calculating an amount of hydrocarbons absorbed in the catalytic device per unit volume of exhaust gas over a period of time, calculating an amount of hydrocarbons desorbed in the catalytic device per unit volume of exhaust gas over the period of time, and calculating an amount of hydrocarbons oxidized in the catalytic device per unit volume of exhaust gas over the period of time. The amount of hydrocarbons oxidized in the catalytic device and the amount of hydrocarbons desorbed in the catalytic device are subtracted from the amount of hydrocarbons absorbed in the catalytic device to determine the amount of hydrocarbons stored in the catalytic device.

17 Claims, 1 Drawing Sheet

METHOD OF ESTIMATING HYDROCARBON STORAGE IN A CATALYTIC DEVICE

TECHNICAL FIELD

The invention generally relates to a method of estimating a quantity or mass of hydrocarbon storage in a catalytic device of an exhaust gas treatment system.

BACKGROUND

Vehicles with an Internal Combustion Engine (ICE) include an exhaust gas treatment system for reducing the toxicity of the exhaust gas from the engine. The treatment system typically includes at least one and often multiple catalytic devices. If the engine includes a diesel engine, then the catalytic devices may include, for example, one or more of a diesel particulate filter, a diesel oxidation catalyst, a catalytic converter, and/or a selective catalytic reduction device. Each of the catalytic devices includes a catalyst that reduces nitrogen oxides in the exhaust gas to nitrogen and carbon dioxide or water, as well as oxidizes carbon monoxide (CO) and unburnt hydrocarbons (HCs) to carbon dioxide and water. The catalyst may include, but is not limited to, Platinum Group Metals (PGM). The catalyst must be heated to a light-off temperature of the catalyst before the catalyst becomes operational. Accordingly, the exhaust gas must heat the catalyst to the light-off temperature before the reaction between the catalyst and the exhaust gas begins. The catalyst may be intentionally heated to the light-off temperature during a regeneration process to burn off the accumulated hydrocarbons.

In order to determine when to regenerate the exhaust gas treatment system, the vehicle may use a model to predict when the catalytic device(s) are required to be regenerated. The model provides an estimation of the accumulated hydrocarbons in the catalytic device, based on one or more actual operating conditions of the vehicle. The operation of the engine may be controlled to heat the catalyst to the light-off temperature, to regenerate the catalytic device(s), based on the estimated hydrocarbon accumulation or storage from the model.

SUMMARY

A method of estimating hydrocarbon storage in a catalytic device of an exhaust gas treatment system is provided. The method includes calculating an amount of hydrocarbons absorbed in the catalytic device per unit volume of exhaust gas over a period of time, calculating an amount of hydrocarbons desorbed in the catalytic device per unit volume of exhaust gas over the period of time, and calculating an amount of hydrocarbons oxidized in the catalytic device per unit volume of exhaust gas over the period of time. The amount of hydrocarbons oxidized in the catalytic device and the amount of hydrocarbons desorbed in the catalytic device are subtracted from the amount of hydrocarbons absorbed in the catalytic device to determine the amount of hydrocarbons stored in the catalytic device. The exhaust gas treatment system is then controlled based upon the estimated hydrocarbon storage of the catalytic device.

A method of estimating hydrocarbon storage in a catalytic device of an exhaust gas treatment system is also provided. The method includes estimating the hydrocarbon storage of the catalytic device from Equation 1)

$$\Omega \frac{d\theta_{HC}}{dt} = \frac{\Delta[HC]_{absorp} - \Delta[HC]_{desorp} - \Delta[HC]_{oxi}}{\frac{t_{res}}{1 + \frac{t_{res}}{\Delta t}}}. \quad 1)$$

Referring to Equation 1 above, $$\Omega \frac{d\theta_{HC}}{dt}$$

is the rate of change in hydrocarbon storage per unit volume of the catalytic device, $\Delta[HC]_{absorp}$ is the amount of hydrocarbons absorbed in the catalytic device per unit volume of exhaust gas, $\Delta[HC]_{desorp}$ is the amount of hydrocarbons desorbed in the catalytic device per unit volume of exhaust gas, $\Delta[HC]_{oxi}$ is the amount of hydrocarbons oxidized in the catalytic device per unit volume of exhaust gas, $t_{res}$ is the residence time of the exhaust gas within the catalytic device, and $\Delta t$ is the change in time (i.e., time duration). The exhaust gas treatment system is then controlled based upon the estimated hydrocarbon storage of the catalytic device.

Accordingly, Equation 1 is a mass balance equation that balances the incoming mass of the hydrocarbons with the outgoing mass of the hydrocarbons to estimate that the amount of hydrocarbons stored in the catalytic device.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
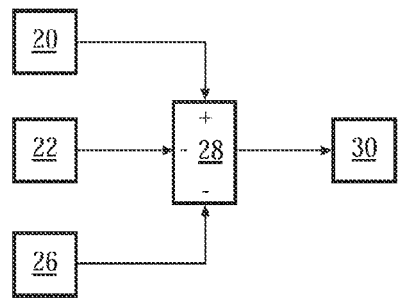
FIG. 1 is a flowchart showing a method of estimating hydrocarbon storage in a catalytic device.

Referring to the Figures, wherein like numerals indicate like parts throughout the several views, a flowchart showing a method of estimating hydrocarbon storage in a catalytic device of an exhaust gas treatment system is generally shown in FIG. 1. As is generally appreciated, the exhaust gas treatment system treats the flow of exhaust gas from an engine, such as but not limited to a diesel engine or a gasoline engine.

The exhaust gas treatment system may include one or more devices that include a catalyst, such as but not limited to a catalytic converter. When the engine is a diesel engine, the catalytic device may include, but is not limited to, a diesel oxidation catalyst, a diesel particulate filter, or a selective catalytic reduction system. In order to properly control the catalytic device, a vehicle controller must estimate the amount of hydrocarbon storage of the catalytic device. For example, the controller may use the estimated amount of hydrocarbon storage of the catalytic device to determine when to regenerate, i.e., burn off, the hydrocarbons stored in the catalytic device.

As noted above, the vehicle includes a controller to control and/or monitor the operation of the engine and/or an exhaust gas treatment system, including the catalytic device. The controller may include a computer and/or processor, and include all software, hardware, memory, algorithms, connections, sensors, etc., necessary to manage, monitor, and control the operation of the engine and the exhaust gas treatment system. As such, the method described below may be embodied as a program operable on the controller. It should be appreciated that the controller may include any device capable of analyzing data from various sensors, comparing data, making the necessary decisions required to control the operation of the engine and/or exhaust gas treatment system, and perform the various calculations required to calculate the estimated hydrocarbon storage of the catalytic device.

Referring to FIG. 1, the method of estimating the amount of hydrocarbon storage in the catalytic device includes calculating an amount of hydrocarbons absorbed in the catalytic device per unit volume of exhaust gas over a period of time, generally indicated by box 20, calculating an amount of hydrocarbons desorbed in the catalytic device per unit volume of exhaust gas over the period of time, generally indicated by box 22, and calculating an amount of hydrocarbons oxidized in the catalytic device per unit volume of exhaust gas over the period of time, generally indicated by box 26. The amount of hydrocarbons oxidized 26 in the catalytic device and the amount of hydrocarbons desorbed 22 in the catalytic device are subtracted from the amount of hydrocarbons absorbed 20 in the catalytic device, generally indicated by box 28, to determine the amount of hydrocarbons stored in the catalytic device, generally indicated by box 30. Accordingly, the method uses a mass balance between the hydrocarbon absorption 20, hydrocarbon desorption 22, and hydrocarbon oxidation 26 to determine the hydrocarbon storage of the catalytic device.

The hydrocarbon storage of the catalytic device may be estimated from Equation 1:

$$\Omega \frac{d\theta_{HC}}{dt} = \frac{\Delta[HC]_{absorp} - \Delta[HC]_{desorp} - \Delta[HC]_{oxi}}{\frac{t_{res}}{1 + \frac{t_{res}}{\Delta t}}}; \quad 1)$$

wherein $$\Omega \frac{d\theta_{HC}}{dt}$$

is the rate of change in hydrocarbon storage per unit volume of the catalytic device, $\Delta[HC]_{absorp}$ is the amount of hydrocarbons absorbed in the catalytic device per unit volume of exhaust gas, $\Delta[HC]_{desorp}$ is the amount of hydrocarbons desorbed in the catalytic device per unit volume of exhaust gas, $\Delta[HC]_{oxi}$ is the amount of hydrocarbons oxidized in the catalytic device per unit volume of exhaust gas, $t_{res}$ is the residence time of the exhaust gas within the catalytic device, and $\Delta t$ is the change in time (i.e., time duration).

The amount of hydrocarbons desorbed in the catalytic device per unit volume ($\Delta[HC]_{desorp}$) may be calculated from Equation 2:

$$\Delta[HC]_{desorp} = \left(\frac{t_{res}}{1 + \frac{t_{res}}{\Delta t}}\right) \Omega k_{desorp} \quad 2)$$

wherein $t_{res}$ is the residence time of the exhaust gas within the catalytic device, $\Delta t$ is the change in time (i.e., time duration), $\Omega$ is the maximum amount of hydrocarbon storage per unit volume of the catalytic device, and $k_{desorp}$ is the normalized hydrocarbon storage desorption rate.

Figure 2:
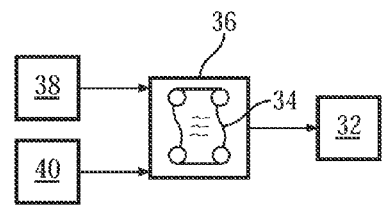
FIG. 2 is a schematic diagram showing a mapping structure for determining a normalized hydrocarbon storage desorption rate ($k_{desorp}$).

Referring to FIG. 2, a value for the normalized hydrocarbon storage desorption rate ($k_{desorp}$), generally indicated by box 32, may be obtained from a desorption rate table 34, stored in the memory of the controller. Obtaining the normalized hydrocarbon storage desorption rate, generally indicated by box 36, which is used to calculate the amount of hydrocarbons desorbed in the catalytic device per unit volume ($\Delta[HC]_{desorp}$), may include referencing the desorption rate table 34 to look up the normalized hydrocarbon storage desorption rate ($k_{desorp}$) 32. The desorption rate table 34 may be defined as a two dimensional table, that uses two input values to define an output value. The normalized hydrocarbon storage desorption rate ($k_{desorp}$) 32 is based upon a temperature of the catalytic device (T) 38, and a normalized hydrocarbon storage of the catalytic device ($\theta_{HC}$) 40. Accordingly, the controller may use the temperature of the catalytic device (T) 38 and a normalized hydrocarbon storage of the catalytic device ($\theta_{HC}$) 40 as the two inputs into the desorption rate table 34, to look up and/or define the value for the normalized hydrocarbon storage desorption rate ($k_{desorp}$) 32, which is the output of the desorption rate table.

The amount of hydrocarbons oxidized in the catalytic device per unit volume of exhaust gas ($\Delta[HC]_{oxi}$) may be calculated from Equation 3:

$$\Delta[HC]_{oxi} = \frac{\Delta[O2]}{Ratio_{stoic\_O2\_HC}}; \quad 3)$$

wherein $\Delta[O2]$ is the O2 (oxygen) consumed in the catalytic device per unit volume of exhaust gas, and $Ratio_{stoic\_O2\_HC}$ is the O2 and hydrocarbon reaction stoichiometric ratio.

Figure 3:
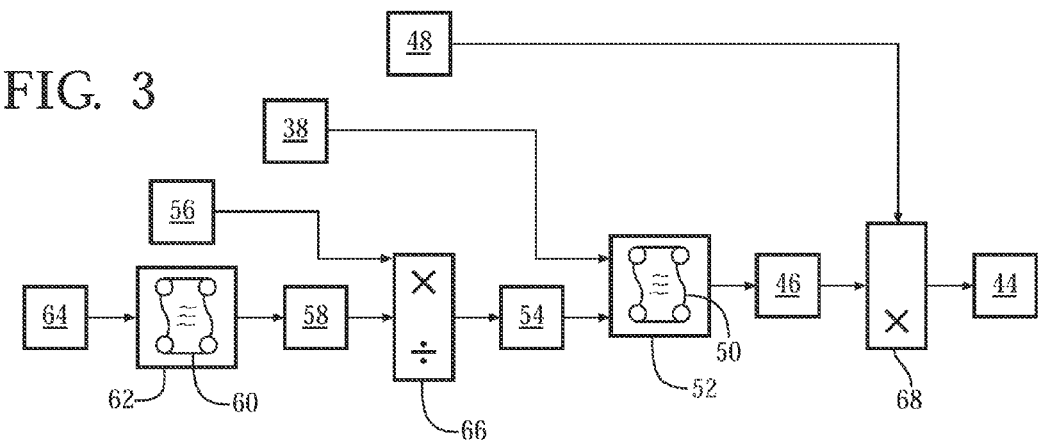
FIG. 3 is a schematic diagram showing a mapping structure for determining an amount of hydrocarbons absorbed in the catalytic device per unit volume of exhaust gas ($\Delta[HC]_{absorp}$).

Referring to FIG. 3, the O2 consumed in the catalytic device per unit volume of exhaust gas 44 ($\Delta[O2]$) is a function of an oxygen burn efficiency ratio 46 and an amount of O2 available for reaction with hydrocarbons per unit volume of exhaust gas 48. The amount of O2 available for reaction with hydrocarbons per unit volume of exhaust gas 48 may be calculated from Equation 4:

$$\eta_{diff} \left( \frac{[O2]_{in} + [O2]_{-1} \frac{t_{res}}{\Delta t}}{1 + \frac{t_{res}}{\Delta t}} \right); \quad 4)$$

wherein $\eta_{\text{diff}}$ is the oxidation catalyst diffusion efficiency ratio, $[O2]_{in}$ is the oxidation catalyst inlet O2 concentration, $[O2]_{-1}$ is the O2 concentration in the catalytic device at a last time increment, $t_{res}$ is the residence time of the exhaust gas within the catalytic device, and $\Delta t$ is the change in time (i.e., time duration).

As shown in FIG. 3, a value for the oxygen burn efficiency ratio 46 may be obtained from a burn efficiency table 50, stored in the memory of the controller. Obtaining the value, generally indicated by box 52, for the oxygen burn efficiency ratio 46, which is used to calculate the O2 consumed in the catalytic device per unit volume of exhaust gas 44 ($\Delta[O2]$), may include referencing the burn efficiency table 50 to look-up the value for the oxygen burn efficiency ratio 46. The burn efficiency table 50 may be defined as a two dimensional table, that uses two input values to define an output value. The oxygen burn efficiency ratio 46 is based upon a temperature of the catalytic device 38 (T), and a first intermediate variable for hydrocarbon oxidation 54. Accordingly, the controller may use the temperature of the catalytic device 38 (T) and first intermediate variable for hydrocarbon oxidation 54 as the two inputs into the burn efficiency table 50, to look up and/or define the value for the oxygen burn efficiency ratio 46, which is the output of the burn efficiency table 50.

As shown in FIG. 3, the first intermediate variable for hydrocarbon oxidation 54 is a function of a second intermediate variable for hydrocarbon oxidation 56 ($\zeta_{O2}$), and an oxidation catalyst diffusion efficiency ratio 58. The second intermediate variable for hydrocarbon oxidation 56 ($\zeta_{O2}$) may be calculated from Equation 5:

$$\varsigma O2 = \Omega f(\theta_{HC}) \frac{t_{res}}{1 + \frac{t_{res}}{\Delta t}} \qquad 5)$$

wherein $\Omega$ is the maximum amount of hydrocarbon storage per unit volume of the catalytic device, $f(\theta_{HC})$ is a function of the normalized hydrocarbon storage of the catalytic device, $t_{res}$ is the residence time of the exhaust gas within the catalytic device, and $\Delta t$ is the change in time (i.e., time duration).

As shown in FIG. 3, a value for the oxidation catalyst diffusion efficiency ratio 58 may be obtained from a diffusion efficiency table 60, stored in the memory of the controller. Obtaining the value, generally indicated by box 62, for the oxidation catalyst diffusion efficiency ratio 58, which is used to calculate the first intermediate variable for hydrocarbon oxidation 54, may include referencing the diffusion efficiency table 60 to look-up the value for the oxidation catalyst diffusion efficiency ratio 58. The diffusion efficiency table may be defined as a one dimensional table that uses one input value to define a single output value. The oxidation catalyst diffusion efficiency ratio 58 is based upon a residence time of the exhaust gas within the catalytic device 64 ($t_{res}$). Accordingly, the controller may use the residence time of the exhaust gas within the catalytic device 64 ($t_{res}$) as the single input into the diffusion efficiency table 60, to look up and/or define the value for the oxidation catalyst diffusion efficiency ratio 58, which is the output of the diffusion efficiency table 60.

As shown in FIG. 3, once the oxidation catalyst diffusion efficiency ratio 58 is obtained from the diffusion efficiency table 60, and the second intermediate variable for hydrocarbon oxidation 56 ($\zeta_{O2}$) is calculated from Equation 5, the first intermediate variable for hydrocarbon oxidation 54 may be calculated by dividing, generally indicated by box 66, the second intermediate variable for hydrocarbon oxidation 56 by the oxidation catalyst diffusion efficiency ratio 58. The first intermediate variable for hydrocarbon oxidation 54 and the temperature of the catalytic device 38 (T) are then used as the inputs into the burn efficiency table 50 to obtain the oxygen burn efficiency ratio 46. The oxygen burn efficiency ratio 46 is then multiplied, generally indicated by box 68, by the amount of O2 available for reaction with hydrocarbons per unit volume of exhaust gas 48, to define and/or calculate the O2 consumed in the catalytic device per unit volume of exhaust gas 44 ($\Delta[O2]$).

Figure 4:
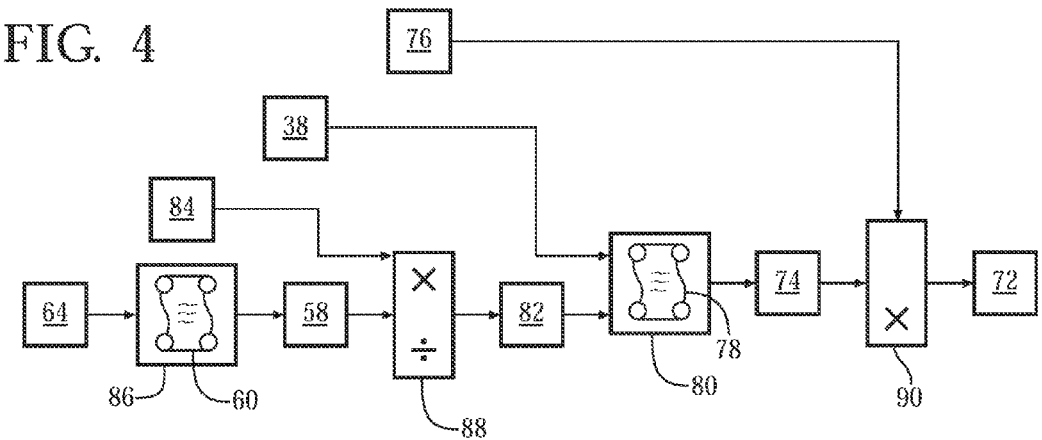
FIG. 4 is a schematic diagram showing a mapping structure for determining an amount of O2 (oxygen) consumed in the catalytic device per unit volume of exhaust gas ($\Delta[O2]$).

Referring to FIG. 4, the amount of hydrocarbons absorbed in the catalytic device per unit volume of exhaust gas 72 ($\Delta[HC]_{absorp}$) is a function of a hydrocarbon absorption efficiency ratio 74, and a hydrocarbon concentration available for absorption 76. The hydrocarbon concentration available for absorption 76 is calculated from Equation 6:

$$\eta_{diff} \left( \frac{[HC]_{in} + [HC]_{-1} \frac{t_{res}}{\Delta t}}{1 + \frac{t_{res}}{\Delta t}} \right) + \left( \frac{t_{res}}{1 + \frac{t_{res}}{\Delta t}} \right) \Omega k_{desorp}; \qquad 6)$$

wherein $\eta_{diff}$ is the oxidation catalyst diffusion efficiency ratio, $[HC]_{in}$ is an oxidation catalyst inlet hydrocarbon concentration, $[HC]_{-1}$ is the hydrocarbon concentration in the catalytic device at the last time increment, $t_{res}$ is the residence time of the exhaust gas within the catalytic device, $\Delta t$ is the change in time (i.e., time duration), $\Omega$ is the maximum amount of hydrocarbon storage per unit volume of the catalytic device, and $k_{desorp}$ is the normalized hydrocarbon storage desorption rate.

As shown in FIG. 4, a value for the hydrocarbon absorption efficiency ratio 74 may be obtained from an absorption efficiency table 78, stored in the memory of the controller. Obtaining the value, generally indicated by box 80, for the hydrocarbon absorption efficiency ratio 74, which is used to calculate the amount of hydrocarbons absorbed in the catalytic device per unit volume of exhaust gas 72 ($\Delta[HC]_{absorp}$), may include referencing the absorption efficiency table 78 to look-up the value for the hydrocarbon absorption efficiency ratio 74. The absorption efficiency table 78 may be defined as a two dimensional table, that uses two input values to define an output value. The hydrocarbon absorption efficiency ratio 74 is based upon a temperature of the catalytic device 38 (T), and a first intermediate variable for hydrocarbon absorption 82. Accordingly, the controller may use the temperature of the catalytic device 38 (T) and the first intermediate variable for hydrocarbon absorption 82 as the two inputs into the absorption efficiency table 78, to look up and/or define the value for the hydrocarbon absorption efficiency ratio 74, which is the output of the absorption efficiency table 78.

As shown in FIG. 4, the first intermediate variable for hydrocarbon absorption 82 is a function of a second intermediate variable for hydrocarbon absorption 84 ($\zeta_{HC\_absorp}$), and the oxidation catalyst diffusion efficiency ratio 58. The second intermediate variable for hydrocarbon absorption 84 ($\zeta_{HC\_absorp}$) may be calculated from Equation 7:

$$\varsigma HC\_absorp = \Omega(1 - \theta_{HC}) \frac{t_{res}}{1 + \frac{t_{res}}{\Delta t}}; \qquad 7)$$

wherein $\Omega$ is the maximum amount of hydrocarbon storage per unit volume of the catalytic device, $\theta_{HC}$ is the normalized hydrocarbon storage of the catalytic device, $t_{res}$ is the residence time of the exhaust gas within the catalytic device, and $\Delta t$ is the change in time (i.e., time duration).

As shown in FIG. 4, a value for the oxidation catalyst diffusion efficiency ratio 58 may be obtained from the diffusion efficiency table 60, stored in the memory of the controller. Obtaining the value, generally indicated by box 86, for the oxidation catalyst diffusion efficiency ratio 58, which is used to calculate the first intermediate variable for hydrocarbon oxidation 82, may include referencing the diffusion efficiency table 60 to look-up the value for the oxidation catalyst diffusion efficiency ratio 58. The diffusion efficiency table 60 may be defined as a one dimensional table that uses one input value to define a single output value. The oxidation catalyst diffusion efficiency ratio 58 is based upon the residence time of the exhaust gas within the catalytic device 64 ($t_{res}$). Accordingly, the controller may use the residence time of the exhaust gas within the catalytic device 64 ($t_{res}$) as the single input into the diffusion efficiency table 60, to look up and/or define the value for the oxidation catalyst diffusion efficiency ratio 58, which is the output of the diffusion efficiency table 60.

As shown in FIG. 4, once the oxidation catalyst diffusion efficiency ratio 58 is obtained from the diffusion efficiency table 60, and the second intermediate variable for hydrocarbon absorption 84 ($\zeta_{HC\_absorp}$) is calculated from Equation 7, the first intermediate variable for hydrocarbon absorption 82 may be calculated by dividing, generally indicated by box 88, the second intermediate variable for hydrocarbon absorption 84 ($\zeta_{HC\_absorp}$) by the oxidation catalyst diffusion efficiency ratio 58. The first intermediate variable for hydrocarbon absorption 82 and the temperature of the catalytic device 38 (T) are then used as the inputs into the absorption efficiency table 78 to obtain the hydrocarbon absorption efficiency ratio 74. The hydrocarbon absorption efficiency ratio 74 is then multiplied, generally indicated by box 90, by the hydrocarbon concentration available for absorption 76, to define and/or calculate the amount of hydrocarbons absorbed in the catalytic device per unit volume of exhaust gas 72 ($\Delta[HC]_{absorp}$).

The operation of the vehicle may be controlled based upon the estimated hydrocarbon storage of the catalytic device. For example, the engine may be controlled to heat the catalyst to the light-off temperature, to regenerate the catalytic device(s), or fuel may be injected into the flow of exhaust gas for combustion to further heat the catalyst.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of estimating hydrocarbon storage in a catalytic device of an exhaust gas treatment system, the method comprising:
   determining hydrocarbon absorption by the catalytic device over a period of time, hydrocarbon desorption by the catalytic device over the period of time, and hydrocarbon oxidation in the catalytic device over the period of time;
   estimating the hydrocarbon storage of the catalytic device, with a controller, from the equation:

$$\Omega \frac{d\theta_{HC}}{dt} = \frac{\Delta[HC]_{absorp} - \Delta[HC]_{desorp} - \Delta[HC]_{oxi}}{\frac{t_{res}}{1 + \frac{t_{res}}{\Delta t}}}$$

wherein $$\Omega \frac{d\theta_{HC}}{dt}$$

is the rate of change in hydrocarbon storage per unit volume of the catalytic device, $\Delta[HC]_{absorp}$ is the amount of hydrocarbons absorbed in the catalytic device per unit volume of exhaust gas, $\Delta[HC]_{desorp}$ is the amount of hydrocarbons desorbed in the catalytic device per unit volume of exhaust gas, $\Delta[HC]_{oxi}$ is the amount of hydrocarbons oxidized in the catalytic device per unit volume of exhaust gas, $t_{res}$ is the residence time of the exhaust gas within the catalytic device, $\Delta t$ is the change in time (i.e., time duration); and controlling the exhaust gas treatment system based upon the estimated hydrocarbon storage of the catalytic device to heat the catalytic device to the light-off temperature to regenerate the catalytic device.

2. The method set forth in claim 1 wherein $\Delta[HC]_{desorp}$ is calculated from the equation:

$$\Delta[HC]_{desorp} = \left(\frac{t_{res}}{1 + \frac{t_{res}}{\Delta t}}\right) \Omega k_{desorp}$$

wherein $t_{res}$ is the residence time of the exhaust gas within the catalytic device, $\Delta t$ is the change in time (i.e., time duration), $\Omega$ is the maximum amount of hydrocarbon storage per unit volume of the catalytic device, and $k_{desorp}$ is the normalized hydrocarbon storage desorption rate.

3. The method set forth in claim 2 further comprising obtaining a value for $k_{desorp}$ from a table based upon a temperature of the catalytic device (T) and a normalized hydrocarbon storage of the catalytic device ($\theta_{HC}$).

4. The method set forth in claim 1 wherein $\Delta[HC]_{oxi}$ is calculated from the equation:

$$\Delta[HC]_{oxi} = \frac{\Delta[O2]}{\text{Ratio}_{stoic\_O2\_HC}}$$

wherein $\Delta[O2]$ is the O2 (oxygen) consumed in the catalytic device per unit volume of exhaust gas, and $\text{Ratio}_{stoic\_O2\_HC}$ is the O2 and hydrocarbon reaction stoichiometric ratio.

5. The method set forth in claim 4 wherein the O2 consumed in the catalytic device per unit volume of exhaust gas ($\Delta[O2]$) is a function of an oxygen burn efficiency ratio and an amount of O2 available for reaction with hydrocarbons per unit volume of exhaust gas, wherein the amount of O2 available for reaction with hydrocarbons per unit volume of exhaust gas is calculated from the equation:

$$\eta_{diff}\left(\frac{[O2]_{in} + [O2]_{-1}\frac{t_{res}}{\Delta t}}{1 + \frac{t_{res}}{\Delta t}}\right)$$

wherein $\eta_{diff}$ is the oxidation catalyst diffusion efficiency ratio, $[O2]_{in}$ is the oxidation catalyst inlet O2 concentration, $[O2]_{-1}$ is the O2 concentration in the catalytic device at last time increment, $t_{res}$ is the residence time of the exhaust gas within the catalytic device, and $\Delta t$ is the change in time (i.e., time duration).

6. The method as set forth in claim 5 further comprising obtaining a value for the oxygen burn efficiency ratio from a table based upon a temperature of the catalytic device (T) and a first intermediate variable for hydrocarbon oxidation.

7. The method as set forth in claim 6 wherein the first intermediate variable for hydrocarbon oxidation is a function of a second intermediate variable for hydrocarbon oxidation ($\zeta_{O2}$) and a oxidation catalyst diffusion efficiency ratio; wherein $\zeta_{O2}$ is calculated from the equation:

$$\varsigma O2 = \Omega f(\theta_{HC}) \frac{t_{res}}{1 + \frac{t_{res}}{\Delta t}}$$

wherein $\Omega$ is the maximum amount of hydrocarbon storage per unit volume of the catalytic device, $f(\theta_{HC})$ is a function of the normalized hydrocarbon storage of the catalytic device, $t_{res}$ is the residence time of the exhaust gas within the catalytic device, and $\Delta t$ is the change in time (i.e., time duration).

8. The method set forth in claim 7 further comprising obtaining a value of the oxidation catalyst diffusion efficiency ratio from a table based upon the residence time of the exhaust gas within the catalytic device ($t_{res}$).

9. The method set forth in claim 1 wherein $\Delta[HC]_{absorp}$ is a function of a hydrocarbon absorption efficiency ratio and a hydrocarbon concentration available for absorption, wherein the hydrocarbon concentration available for absorption is calculated from the equation:

$$\eta_{diff}\left(\frac{[HC]_{in} + [HC]_{-1}\frac{t_{res}}{\Delta t}}{1 + \frac{t_{res}}{\Delta t}}\right) + \left(\frac{\frac{t_{res}}{1 + \frac{t_{res}}{\Delta t}}}\right)\Omega k_{desorp}$$

wherein $\eta_{diff}$ is the oxidation catalyst diffusion efficiency ratio, $[HC]_{in}$ oxidation catalyst inlet hydrocarbon concentration, $[HC]_{-1}$ is the hydrocarbon concentration in the catalytic device at the last time increment, $t_{res}$ is the residence time of the exhaust gas within the catalytic device, $\Delta t$ is the change in time (i.e., time duration), $\Omega$ is the maximum amount of hydrocarbon storage per unit volume of the catalytic device, and $k_{desorp}$ is the normalized hydrocarbon storage desorption rate.

10. The method as set forth in claim 9 further comprising obtaining a value for the hydrocarbon absorption efficiency ratio from a table based upon the temperature of the catalytic device (T) and a first intermediate variable for hydrocarbon absorption.

11. The method as set forth in claim 10 wherein the first intermediate variable for hydrocarbon absorption is a function of a second intermediate variable for hydrocarbon absorption ($\zeta_{HC\_absorp}$) and a oxidation catalyst diffusion efficiency ratio, wherein $\zeta_{HC\_absorp}$ is calculated from the equation:

$$\varsigma HC\_absorp = \Omega(1 - \theta_{HC})\frac{t_{res}}{1 + \frac{t_{res}}{\Delta t}}$$

wherein $\Omega$ is the maximum amount of hydrocarbon storage per unit volume of the catalytic device, $\theta_{HC}$ is the normalized hydrocarbon storage of the catalytic device, $t_{res}$ is the residence time of the exhaust gas within the catalytic device, and $\Delta t$ is the change in time (i.e., time duration).

12. The method set forth in claim 10 further comprising obtaining a value of the oxidation catalyst diffusion efficiency ratio from a table based upon the residence time of the exhaust gas within the catalytic device ($t_{res}$).

13. A method of estimating hydrocarbon storage in a catalytic device of an exhaust gas treatment system, the method comprising:
    providing a controller, including all necessary hardware, software, algorithm(s), sensors, and memory necessary to determine the amount of hydrocarbons stored in the catalytic device, wherein the controller is operable to perform the following steps;
    calculating, with a controller, an amount of hydrocarbons absorbed in the catalytic device per unit volume of exhaust gas over a period of time;
    calculating, with the controller, an amount of hydrocarbons desorbed in the catalytic device per unit volume of exhaust gas over the period of time, wherein the amount of hydrocarbons desorbed in the catalytic device are calculated from the equation:

$$\Delta[HC]_{desorp} = \left(\frac{t_{res}}{1 + \frac{t_{res}}{\Delta t}}\right)\Omega k_{desorp}$$

wherein $t_{res}$ is the residence time of the exhaust gas within the catalytic device, $\Delta t$ is the change in time (i.e., time duration), $\Omega$ is the maximum amount of hydrocarbon storage per unit volume of the catalytic device, and $k_{desorp}$ is the normalized hydrocarbon storage desorption rate;
    calculating, with the controller, an amount of hydrocarbons oxidized in the catalytic device per unit volume of exhaust gas over the period of time;
    subtracting, with the controller, the amount of hydrocarbons oxidized in the catalytic device and the amount of hydrocarbons desorbed in the catalytic device from the amount of hydrocarbons absorbed in the catalytic device to determine the amount of hydrocarbons stored in the catalytic device; and
    controlling the exhaust gas treatment system based upon the estimated hydrocarbon storage of the catalytic device to heat the catalytic device to the light-off temperature to regenerate the catalytic device.

14. The method set forth in claim 13 wherein calculating the amount of hydrocarbons oxidized in the catalytic device is further defined as calculating the amount of hydrocarbons oxidized in the catalytic device from the equation:

$$\frac{\Delta[O2]}{\text{Ratio}_{stoic\_O2\_HC}}$$

wherein $\Delta[O2]$ is the O2 (oxygen) consumed in the catalytic device per unit volume of exhaust gas, and $\text{Ratio}_{stoic\_O2\_HC}$ is the O2 and hydrocarbon reaction stoichiometric ratio.

15. The method set forth in claim 13 wherein calculating the amount of hydrocarbons absorbed in the catalytic device is a function of a hydrocarbon absorption efficiency ratio and a hydrocarbon concentration available for absorption, wherein the hydrocarbon concentration available for absorption is calculated from the equation:

$$\eta_{diff}\left(\frac{[HC]_{in} + [HC]_{-1}\frac{t_{res}}{\Delta t}}{1 + \frac{t_{res}}{\Delta t}}\right) + \left(\frac{t_{res}}{1 + \frac{t_{res}}{\Delta t}}\right)\Omega k_{desorp}$$

wherein $\eta_{diff}$ is the oxidation catalyst diffusion efficiency ratio, $[HC]_{in}$ oxidation catalyst inlet hydrocarbon concentration, $[HC]_{-1}$ is the hydrocarbon concentration in the catalytic device at the last time increment, $t_{res}$ is the residence time of the exhaust gas within the catalytic device, $\Delta t$ is the change in time (i.e., time duration), $\Omega$ is the maximum amount of hydrocarbon storage per unit volume of the catalytic device, and $k_{desorp}$ is the normalized hydrocarbon storage desorption rate.

16. The method as set forth in claim 15 further comprising obtaining a value for the hydrocarbon absorption efficiency ratio from a table based upon the temperature of the catalytic device (T) and a first intermediate variable for hydrocarbon absorption;

wherein the first intermediate variable for hydrocarbon absorption is a function of a second intermediate variable for hydrocarbon absorption ($\zeta_{HC\_absorp}$) and a oxidation catalyst diffusion efficiency ratio;

wherein $\zeta_{HC\_absorp}$ is calculated from the equation:

$$\zeta HC\_absorp = \Omega(1 - \theta_{HC})\frac{\frac{t_{res}}{1 + \frac{t_{res}}{\Delta t}}}{}$$

wherein $\Omega$ is the maximum amount of hydrocarbon storage per unit volume of the catalytic device, $\theta_{HC}$ is the normalized hydrocarbon storage of the catalytic device, $t_{res}$ is the residence time of the exhaust gas within the catalytic device, and $\Delta t$ is the change in time (i.e., time duration).

17. The method set forth in claim 16 further comprising obtaining a value of the oxidation catalyst diffusion efficiency ratio from a table based upon the residence time of the exhaust gas within the catalytic device ($t_{res}$).

\* \* \* \* \*